(12) United States Patent
Hutchinson (10) Patent No.: US 11,491,724 B2
(45) Date of Patent: Nov. 8, 2022

(54) METHOD AND APPARATUS FOR SURFACE FINISHING AND SUPPORT MATERIAL REMOVAL (DECI DUO)

(71) Applicant: PostProcess Technologies, Inc., Buffalo, NY (US)

(72) Inventor: Daniel Joshua Hutchinson, Lancaster, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 358 days.

(21) Appl. No.: 16/209,778

(22) Filed: Dec. 4, 2018

(65) Prior Publication Data

US 2019/0176403 A1 Jun. 13, 2019

Related U.S. Application Data

(60) Provisional application No. 62/595,030, filed on Dec. 5, 2017.

(51) Int. Cl.

| | |
|---|---|
| *B29C 64/35* | (2017.01) |
| *B33Y 40/00* | (2020.01) |
| *B22F 3/24* | (2006.01) |
| *B08B 3/02* | (2006.01) |
| *B08B 3/04* | (2006.01) |
| *B08B 5/02* | (2006.01) |
| *B24C 1/00* | (2006.01) |

(Continued)

(52) U.S. Cl.
CPC ............... *B29C 64/35* (2017.08); *B08B 3/02* (2013.01); *B08B 3/04* (2013.01); *B08B 5/02* (2013.01); *B22F 3/24* (2013.01); *B22F 10/20* (2021.01); *B24C 1/00* (2013.01); *B24C 1/08* (2013.01); *B33Y 40/00* (2014.12); *B22F 10/40* (2021.01); *B22F 10/70* (2021.01); *B22F 2003/247* (2013.01); *B29C 71/009* (2013.01); *Y02P 10/25* (2015.11)

(58) Field of Classification Search
CPC ..... B24C 1/08; B24C 1/00; B22F 3/24; B22F 10/70; B22F 10/40; B22F 10/20; B22F 2003/247; B29C 64/35; B29C 71/0009; B08B 3/02; B08B 3/04; B08B 5/02; B33Y 40/00; Y02P 10/25
See application file for complete search history.

(56) References Cited

U.S. PATENT DOCUMENTS

| | | |
|---|---|---|
| 6,109,277 A | 8/2000 | Linton et al. |
| 6,253,462 B1 | 7/2001 | Schwarz |

(Continued)

FOREIGN PATENT DOCUMENTS

CN 106625275 A 5/2017

*Primary Examiner* — Benjamin L Osterhout
(74) *Attorney, Agent, or Firm* — Hodgson Russ LLP (57) ABSTRACT

Apparatuses and methods for removing support material from and/or smoothing surfaces of an additive-manufactured part are disclosed. Apparatuses may include a spraying chamber, a support surface within the spraying chamber, and one or more nozzles having the ability to spray a fluid at the additive-manufactured parts. The fluid may include a liquid and solid particles carried by the liquid. The support surface may have the ability to support the additive manufactured part. The apparatus may include a tank having the ability to hold at least some of the fluid. A heater may be included for heating the fluid to a desired temperature.

32 Claims, 8 Drawing Sheets

(51) Int. Cl.
  *B24C 1/08* (2006.01)
  *B22F 10/20* (2021.01)
  *B22F 10/70* (2021.01)
  *B29C 71/00* (2006.01)
  *B22F 10/40* (2021.01)

(56) References Cited

U.S. PATENT DOCUMENTS

| | | |
|---|---|---|
| 6,887,125 B2 | 5/2005 | Kurogouchi |
| 9,592,539 B2 | 3/2017 | Dunn et al. |
| 9,855,589 B2 | 1/2018 | Dunn et al. |
| 10,610,904 B2 * | 4/2020 | Tafoya .................. B08B 3/06 |
| 2002/0002987 A1 | 1/2002 | Jones et al. |
| 2002/0170580 A1 | 11/2002 | Clifford et al. |
| 2003/0067098 A1 * | 4/2003 | Newell .................. B33Y 40/00 |
| | | 264/442 |
| 2005/0103360 A1 * | 5/2005 | Tafoya .................. B08B 3/102 |
| | | 134/18 |
| 2006/0160471 A1 | 7/2006 | Takagi et al. |
| 2007/0181169 A1 * | 8/2007 | Wallace .................. B05D 1/18 |
| | | 134/61 |
| 2008/0041423 A1 | 2/2008 | Hardikar et al. |
| 2009/0211616 A1 * | 8/2009 | Tafoya .................. B08B 3/045 |
| | | 134/57 R |
| 2011/0186081 A1 | 8/2011 | Dunn et al. |
| 2012/0125365 A1 | 5/2012 | Ike et al. |
| 2013/0248491 A1 | 9/2013 | Stratasys |
| 2016/0074911 A1 * | 3/2016 | Dore .................. B08B 3/10 |
| | | 134/56 R |
| 2017/0312885 A1 * | 11/2017 | Rhodes .................. B24C 3/26 |
| 2018/0215106 A1 * | 8/2018 | McMahon .............. B08B 3/006 |

* cited by examiner

METHOD AND APPARATUS FOR SURFACE FINISHING AND SUPPORT MATERIAL REMOVAL (DECI DUO)

CROSS-REFERENCE TO RELATED APPLICATION

This patent application claims the benefit of priority to U.S. provisional patent application Ser. No. 62/595,030, which was filed on Dec. 5, 2017 the entire disclosure of which is hereby incorporated by reference.

FIELD OF THE INVENTION

This invention relates generally to a method and apparatus for surface finishing and support material removal from parts made using additive manufacturing techniques such as 3D printing, and, more specifically, to a method and apparatus for surface finishing and support material removal from parts using mechanical agitation, fluid motion, chemical dissolution, and pressurized suspended solid media fluid to smooth the surface finish and remove unwanted support material without damaging the part.

BACKGROUND OF THE INVENTION

Additive manufacturing processes, including three dimensional ("3D") printing, selective laser sintering ("SLS"), stereolithography ("SLA"), fused deposition modeling ("FDM"), material jetting ("MJ"), electron beam ("e-beam"), etc., have revolutionized the design industry. These processes are used to make parts from a variety of build materials, including metals/alloys, ceramics and polymers (including plastics). These additive manufacturing techniques allow for the production of parts having complex geometries which would never be possible through traditional manufacturing techniques, such as casting, injection molding, or forging. However, additive manufacturing suffers from substantial problems. Two of these problems are the presence of unwanted support material and rough part surfaces. A byproduct of additive manufacturing processes is the generation of support material, which support layers of a part during manufacture in order to achieve complex geometries. The support material can itself have a complex geometry and be voluminous, especially when support material is needed in a plurality of areas. Additionally, since additive manufacturing creates a part in discrete layers, the surface finish of a part is rough, because each printed layer may not end precisely at a desired location, and may not form continuously with the next layer, thus leaving a rough outer surface. This rough outer surface is visually unappealing and can cause stress concentrations, which could develop during testing or use of the part, leading to premature failure.

The current solution in the additive manufacturing industry is to manually remove the support material and to even out the surface finish of the part. Depending on the type of part or its design, using manual labor could be cost prohibitive. Additionally, with manual labor, it is difficult to avoid removing too much material and uneven surface finishing. If a surface is finished unevenly, stress concentrations could still exist, leading to pre-mature failure. Further, manual support removal and surface finishing lacks the ability to be consistent over an extended period of time, and it creates a bottleneck in the production process since one technician can clean only one part at a time. In any event, it can take a long time to clean and smooth even one part, let alone a large number of parts.

Another solution that the additive manufacturing industry is moving toward is using a machine to remove support material and perform surface finishing. However, these machines are limited in the type of process parameters that can be altered to improve the process, and also often require ongoing involvement during operation by a technician thus failing to completely eliminate the manual labor obstacle. Additionally, if a technician is unaware that a machine is not set at the proper parameters, excessive material removal could occur, essentially ruining the part. Thus, there has been a long-felt need for a method and apparatus for automatically smoothing the surface finish and removing unwanted support material from parts made using additive manufacturing techniques.

SUMMARY OF THE INVENTION

Disclosed herein are devices and methods to use mechanical agitation, fluid motion, chemical dissolution, and pressurized fluid having suspended solid media to smooth the surface finish and remove unwanted support material while avoiding damage to the part itself.

Such devices and methods may provide a way to reduce the manual labor cost, bottleneck and inconsistencies of post processing additive manufactured parts.

These and other objects, features and advantages will become readily apparent upon a review of the following detailed description, in view of the drawings and appended claims.

The invention may be embodied as an apparatus for removing support material from and/or smoothing surfaces of an additive-manufactured part. The apparatus may include a spraying chamber, a support surface within the spraying chamber, and one or more nozzles having the ability to spray a fluid at the additive-manufactured parts. In one embodiment of the invention, the fluid may have solid particles carried by a liquid and in another embodiment of the invention, the solid particles are suspended in the liquid (collectively "SSM fluid"). The support surface may have the ability to support the additive-manufactured part. The apparatus may include a tank having the ability to hold at least some of the SSM fluid. A heater may be included for heating the SSM fluid to a desired temperature.

The nozzles may include a first inlet for receiving a flow of the SSM fluid, a second inlet for receiving a flow of compressed air, and an outlet through which SSM fluid and air can exit the nozzle. The nozzle may be configured to combine the SSM fluid and the compressed air prior to exiting the outlet of the nozzle.

The support surface may have openings sized and configured to allow the SSM fluid to pass through the openings. The support surface may be rotatable in one or both of clockwise and counterclockwise directions. An actuator may be mechanically connected to the support surface for causing the support surface to rotate.

The nozzles may include a first nozzle situated for spraying the SSM fluid substantially in a first direction, and a second nozzle situated for spraying the SSM fluid substantially in a second direction. The first direction may be substantially perpendicular to the second direction. The first direction may be substantially horizontal, and the second direction may be substantially vertical.

The first nozzle may be secured to a mount that is adjustable to move the nozzle nearer to or further away from the support surface. The second nozzle may be secured to a mount that is adjustable to move the nozzle nearer to or further away from the support surface. One or both of the first and second nozzles may be connected directly or indirectly to an actuator for translating the nozzle back and forth in a substantially planar motion.

The apparatus may include one or more of the following: (a) a pH monitor for monitoring a pH of the SSM fluid, (b) a pump for pumping the SSM fluid to one or more of the nozzles, (c) a pump for pumping air to the one or more nozzles and/or a valve for controlling the flow of compressed air to the one or more nozzles.

The apparatus may include a computer for controlling flow of the SSM fluid to the nozzles. The computer may be programmed to operate one or more valves controlling flow to the one or more nozzles. The computer may include a memory for storing operating parameters. The operating parameters may include at least one of (a) a temperature of the SSM fluid, (b) a pressure of the SSM fluid, (c) a pressure of air supplied to the one or more nozzles.

The invention may be embodied as a method of removing support material from and/or smoothing surfaces of an additive manufactured part. Such a method may include (a) providing a spraying chamber, (b) providing a support surface within the spraying chamber, the support surface having the ability to support one or more additive-manufactured parts, (c) providing one or more nozzles having the ability to spray an SSM fluid at the additive-manufactured parts, (d) providing one or more additive-manufactured parts supported by the support surface, and (e) spraying the SSM fluid from the one or more nozzles at the one or more additive-manufactured parts. A method according to the invention may be carried out by providing air to the nozzle, and mixing the air with the SSM fluid, which may be done prior to spraying the SSM fluid.

The support surface may be rotated so that the one or more additive manufactured parts move within the chamber. Spraying the SSM fluid may be carried out by varying the flow rate of the SSM fluid. Such variation of the flow rate may be carried out in a pulsing manner. Varying of the flow rate may be carried out by controlling a valve, such as a flow-control valve or a pressure-control valve.

BRIEF DESCRIPTION OF THE DRAWINGS

For a fuller understanding of the nature and objects of the invention, reference should be made to the accompanying drawings and the subsequent description. Briefly, the drawings are:

FIG. 6A, which is similar to FIG. 5C, and FIG. 6B, which is a cross-sectional view taken along the line B-B in FIG. 6A.

FURTHER DESCRIPTION OF THE INVENTION

It should be noted that like drawing numbers on different drawing views identify identical, or functionally similar, structural elements. It is to be understood that the invention is not limited to the disclosed aspects.

Furthermore, the invention is not limited to the particular methodology, materials, or modifications described. As such, the invention may vary from that which is disclosed herein. It is noted that the terminology used herein is for the purpose of describing particular embodiments and aspects of the invention.

Unless defined otherwise, all technical and scientific terms used herein have the same meaning as commonly understood to one of ordinary skill in the art to which the invention pertains. It should be understood that any methods, devices or materials similar or equivalent to those described herein may be used in the practice or testing of the method and apparatus.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Furthermore, as used herein, "optimize" is intended to mean an act, process, or methodology of making something (such as a design, system, or decision) as fully perfect, functional, or effective as possible. For example, an optimal process will achieve the best results possible from the process under the parameter ranges that the process is allowed to operate in. Additionally, as used herein, "determine", "determined", and "determining" are intended to mean the act of receiving information (e.g. example from a sensor) and executing an algorithm or process using that information to produce an output. The execution of such an algorithm or process may be carried out by circuitry, which may include a microprocessor programmed to execute such an algorithm.

Figure 1:
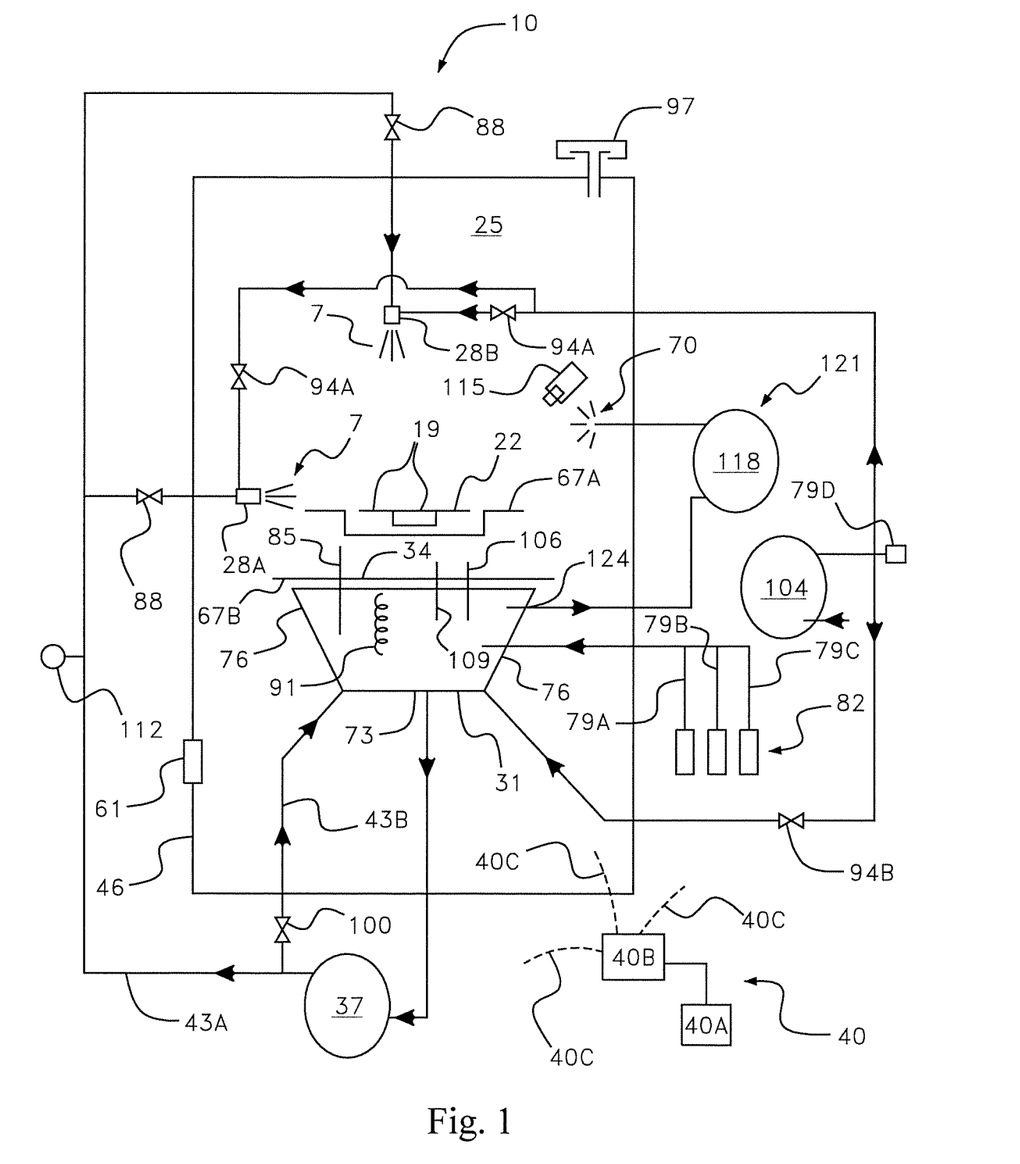
FIG. 1, which is schematic of an apparatus that is in keeping with the invention.
Figure 2:
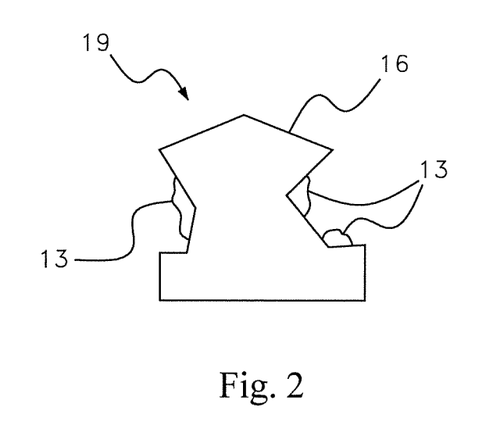
FIG. 2, which is a schematic of a part with support material that has been made by an additive manufacturing process.
Figure 3A:
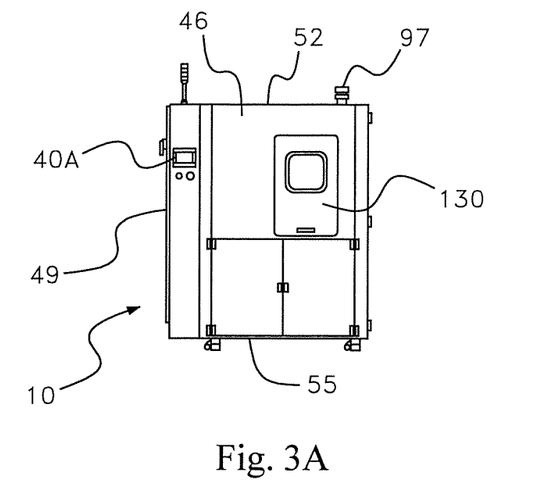
FIGS. 3A, 3B, and 3C, which are front, side and top views respectively of an apparatus that is in keeping with the invention.
Figure 3B:
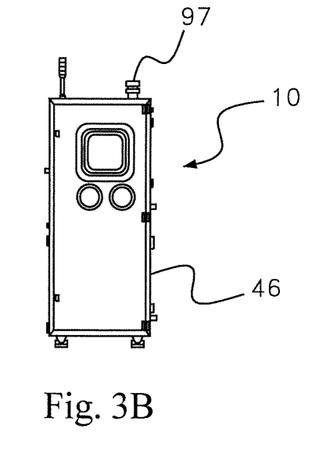
Figure 3C:
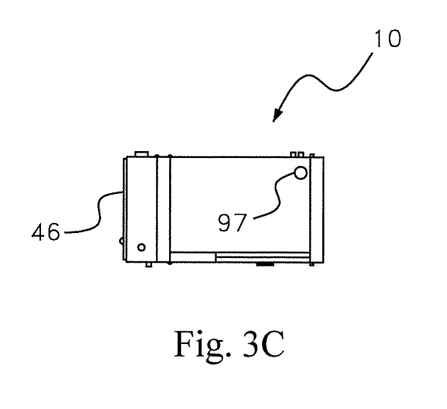
Figure 4A:
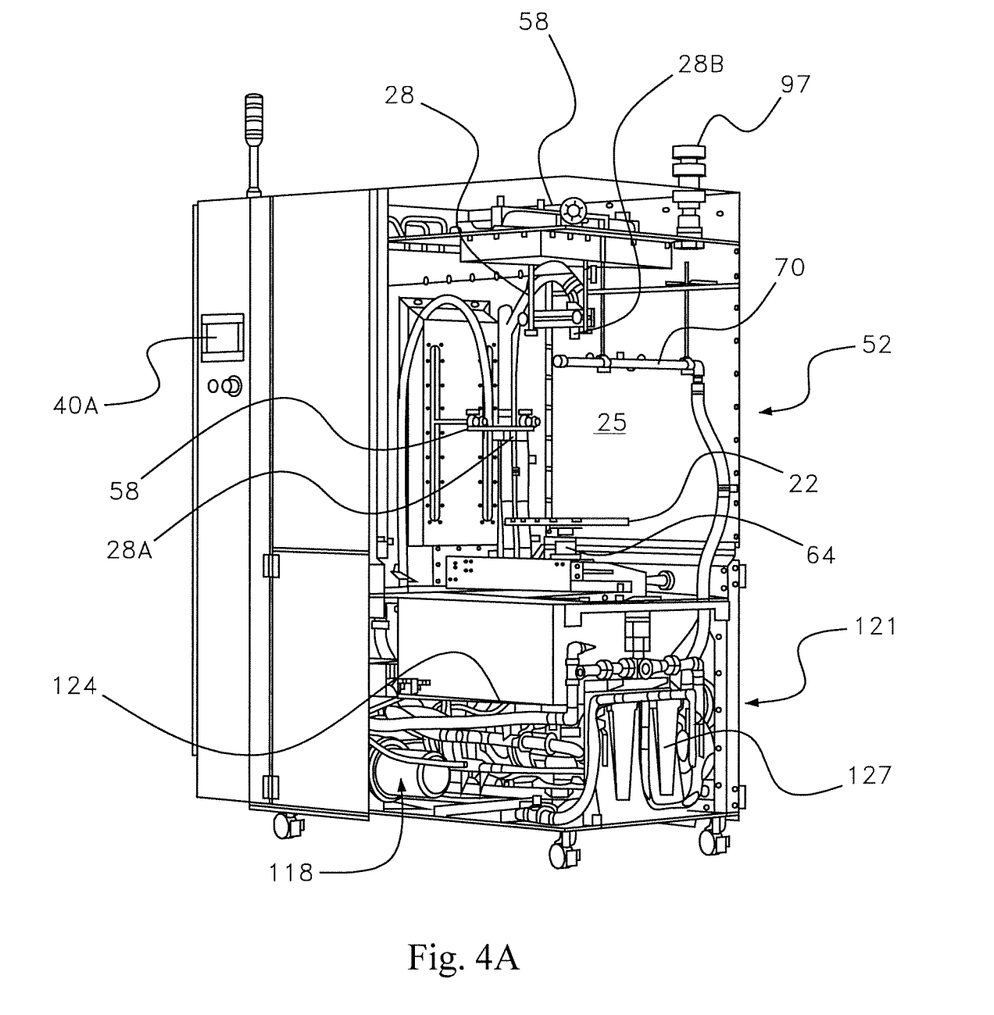
FIGS. 4A, 4B, and 4C, which are perspective views of an apparatus that is in keeping with the invention, each view having a portion of the housing removed to show components and positioning of those components.
Figure 4B:
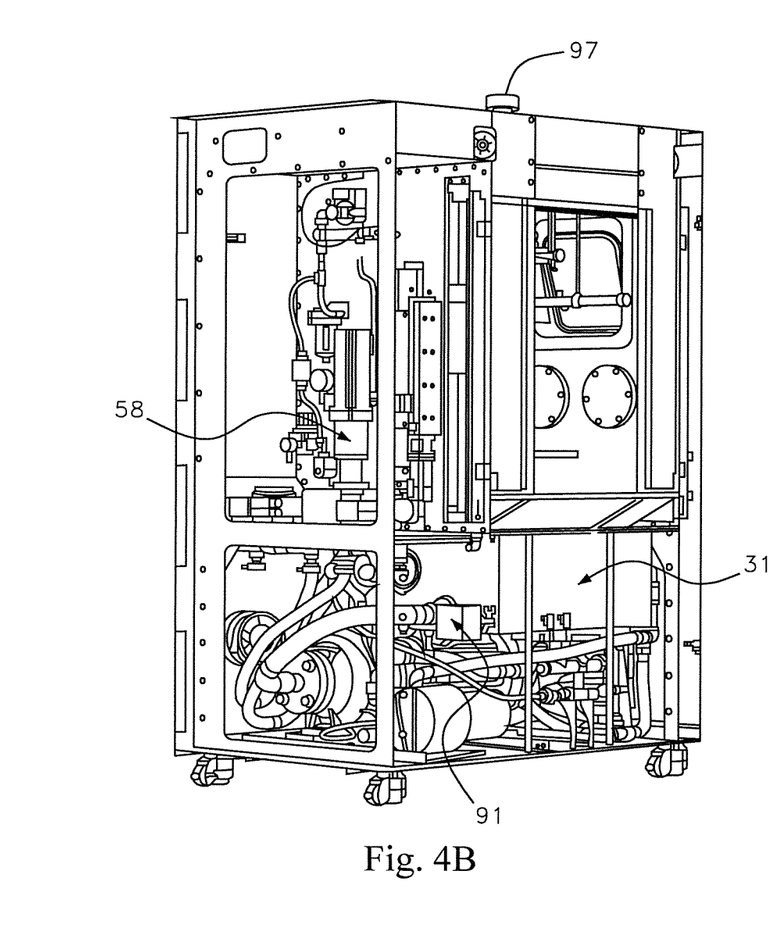
Figure 4C:
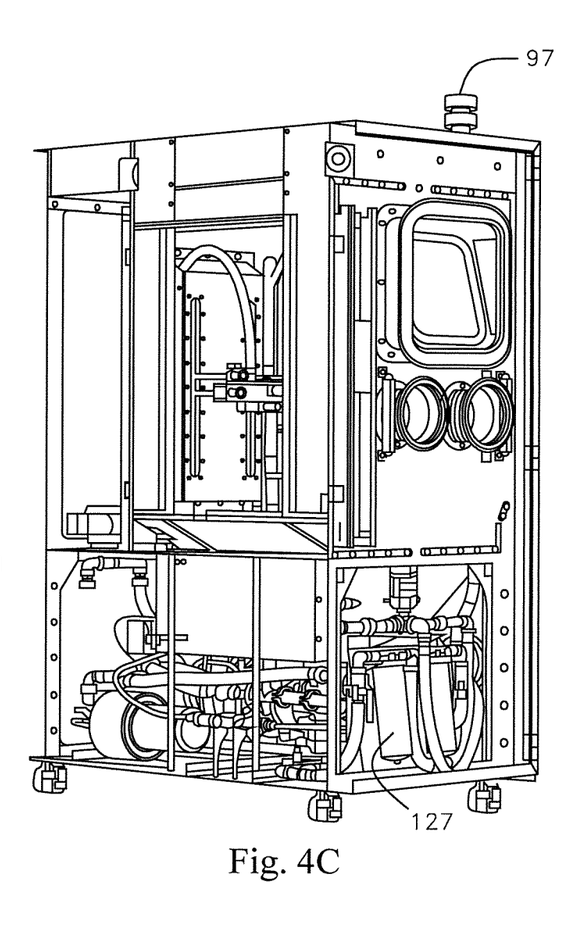

Adverting now to the Figures, embodiments of the present invention use a suspended solid media fluid ("SSM fluid") 7 to remove unwanted support material 13 from an additive-manufactured part (the "AM-Part") 19, while also smoothing the surface finish of the build material 16 of the AM-Part. SSM fluid 7 is a liquid media having small solid particles suspended in and/or carried by the liquid media. The particles may be selected and included to facilitate abrasion to remove support material and/or smoothing AM-Part surfaces. The present invention may be embodied as a method and/or an apparatus 10 for removing support material 13 attached or adhered to the AM-Part 19, while also smoothing the surface finish of the AM-Part 19. In embodiments of the invention, AM-Part 19 needing removal of support material 13 and/or smoothing of surfaces of build material 16 may be placed on a platform, such as a turntable 22, in a spraying chamber 25 of the apparatus 10. An SSM fluid 7 for dissolving and/or eroding the support material 13 and for smoothing of surfaces of build material 16 of the AM-Part 19 may be sprayed at the AM-Part 19 through nozzles 28 situated above the AM-Part 19 and/or to the side of the AM-Part 19. The SSM fluid 7 may be supplied from a tank 31, open at its upper side 34 like a basin. The tank 31 may be situated below the turntable 22. A media pump 37 may be used to draw SSM fluid 7 from the tank 31 and then force the SSM fluid 7 through fluid conduits 43A, such as pipes, tubes, and/or hoses, to the nozzles 28, which, together with forced air, cause the SSM fluid 7 to spray out of the nozzles 28 at the AM-Part 19. The SSM fluid 7 then collects back into the tank 31 and the SSM fluid 7 may be recycled, i.e., drawn from the tank 31, pumped to the nozzles 28, and again sprayed at the AM-Parts 19. In this mode of operation a substantially closed-loop system may be created, except that fresh forced air (i.e. "compressed air") may be added to the system during operation, and SSM fluid 7 may be added or removed periodically to maintain a desired SSM fluid 7 level in the tank 31.

AM-Parts 19 may be made using different methods and classes of materials (e.g., polymers versus metals). Within the available classes of materials, specific build materials 16 (e.g., nylon within the polymers category, or aluminum within the metals category) and specific support materials 13 may be used. Each type of additive manufacturing method, build material 16 and support material 13 may have their own unique properties and characteristics and thus may require different parameters for effective and efficient support material 13 removal and surface smoothing of the build material 16. Additionally, AM-Parts 19 may have different geometries, including designs having more delicate features than others, which thus may require even further parameter adjustments for effective and efficient support material 13 removal and/or surface smoothing of the build material 16. As explained in more detail herein with respect to the disclosed invention, the amount of SSM fluid 7 sprayed, the direction of spray (e.g., from top and/or side), the pressure at which SSM fluid 7 is pumped to the nozzles 28, the amount of (if any) forced air that is injected into the SSM fluid 7 at the nozzles 28, and any other parameters such as the make-up, temperature, and pH of the SSM fluid 7, including the type, density and concentration of the solid media particles in the SSM fluid 7, may all be customized to create different combinations or "recipes" of these parameters. As such, each "recipe" is particularly suited for efficiently and effectively removing a given type of support material 13 and smoothing the surfaces of a given type of build material 16 for a given type and design of AM-Part 19. In the present invention, an operator may set, record or change these parameters via a human-machine interface ("HMI") 40, which may include a monitor 40A and a general-purpose computer 40B, as further described herein. The monitor 40A may be a touch-screen monitor. Wired or wireless communications links 40C may be used to send control signals to those components of the apparatus 10 that are controlled by the computer 40B. Communication link 40C may be embodied as a wired or wireless communication link that may be used to send control signals to those components of the apparatus 10 that are controlled by the computer 40B. Wired communication links may include implementations of wired communication protocols and designs such as universal serial bus (USB), Bayonet Neill-Concelman (BNC), fiber-optic, standard coaxial, Ethernet, IEEE 1394 (FireWire), Thunderbolt, RS-232, DB-25, DC-37, DD-50, or other wired communication protocols or designs. Wireless communication links may include implementations of wireless communication protocols and designs such as wide-area network (WAN), IEEE 802.11 (Wi-Fi), Bluetooth, cellular (CDMA, GSM, etc.), near-field communication (NFC), very high frequency (VHF), ultra-high frequency (UHF), super high frequency (SHF) or other wireless communication protocols or designs.

The present invention uses the SSM fluid 7 to remove support material 13 from, and smooth the outer surfaces of, the AM-Part 19. The SSM fluid 7 may be comprised of a liquid media (which may include water, oil, solvent, etc.) and small solid particles carried by or suspended in the liquid media. Examples of small solid particles that may be used in the SSM fluid 7 include, but are not limited to, ceramic and metallic particles. The metallic particles may be any type of metal or alloy, including but not limited to stainless steel and titanium. The density of the material of which the solid particles are made may vary. For example and without limitation, some materials may be of low, medium or high density, for instance, from 70 to 130 pounds per cubic foot. The liquid media may be a detergent solution comprising water, support material solvent such as PolyGone™ from PostProcess Technologies, Inc., and anti-foaming agent.

The uniformity of the suspension of the solid particles in the liquid may be an indicator of the quality of the SSM fluid 7 for use in the apparatus or method. The more uniformly solid particles are suspended, the higher the quality may be. Furthermore, as the SSM fluid 7 is used, the degree to which the solid particles remain uniformly suspended and the degree to which solid particles fall out of suspension may be indicators of the quality of the SSM fluid 7. In relation to a desired concentration of solid particles in the liquid media, as one or both of the uniformity of suspension or concentration of solid particles decreases, performance (e.g. effectiveness and efficiency) of the SSM fluid 7 may be expected to decrease.

The present invention may include a housing 46, an electrical system 49, a mechanical system 52, a pump system 55, and the spraying chamber 25. The electrical system 49 may include electrical components that power and control the various pumps, actuators, and sensors of the apparatus 10. The electrical system 49 also may include the HMI 40, which may include a monitor 40A connected to a general-purpose computer 40B, for the operator to set various parameters and to operate the apparatus 10. The monitor 40A may have touch-screen capability so that the operator can select and input various operating parameters by pressing directly on the monitor. The mechanical system 52 may include mechanical actuators 58 and 64 to move nozzles 28 and rotate the turntable 22, respectively, within the spraying chamber 25. Additionally, the mechanical system 52 may include a fan 61 for cooling the electronics and sensors that can detect certain parameters (i.e., temperature, pressure, pH, etc.) about the process occurring within the spraying chamber 25.

The AM-Parts 19 are processed in the spraying chamber 25 to remove unwanted support material 13 and smooth surfaces of the build material 16. Within the spraying chamber 25 may be a tank 31 arranged in the bottom of the spraying chamber 25, a turntable 22 mechanically connected to an actuator 64, a first nozzle 28A mechanically connected to an actuator 58 and fluidically connected to the media pump 37, a second nozzle 28B mechanically connected to mechanical actuator 58 and fluidically connected to the media pump 37, one or more grates 67 to prevent AM-Parts 19, sediment and support material debris from falling into the tank 31 during operation, and a clean-in-place ("CIP") nozzle 70.

The tank 31 may be arranged below the turntable 22 and may hold the majority of SSM fluid 7 that is used in the process. The media pump 37 may be connected to an outlet 73 of the tank 31, and may be used to draw SSM fluid 7 from the tank 31 and force the SSM fluid 7 to the nozzles 28 for spraying at the AM-Parts 19 that are being processed. The tank 31 may be shaped in such a way to prompt the flow of SSM fluid 7 into the outlet 73 leading to the media pump 37 while helping to keep the solid media particles in the SSM fluid 7 in suspension. The tank 31 may have one or more sloping sides 76 to create a trough style tank 31 which facilitates the flow of suspended particles downward away from the turntable 22, and to prevent accumulation of solid media on the floor of the tank 31 (thereby preserving the concentration of the solid media particles in the liquid).

Embodiments of the apparatus 10 of the present invention may include ports 79 for feeding in each of water via port 79A, support material solvent via port 79B, and anti-foaming agent via port 79C. The apparatus 10 also may include a port 79D for feeding in compressed air, which may be used to operate the nozzles 28 and/or to help keep solid media particles suspended in the SSM fluid 7 in the tank 31. Water may be supplied from a facility's water supply or from a reservoir or other storage vessel. Where water is supplied under pressure, a valve may be used to automatically control the flow of water to the tank 31. Where water is not supplied under pressure, such as from a storage vessel, a pump or dosing mechanism may be used to automatically dispense water to tank 31. Solvent and anti-foaming agent may be supplied each from their own reservoir or storage vessel or tank, such as a 5-gallon bucket connected to the apparatus 10 by a hose or other line. The hose for each of the solvent and anti-foaming agent may be connected to a dosing mechanism 82, for automatically dispensing these fluids into the tank 31, and such a dosing mechanism 82 may be an electric-powered pump, or a water-powered pump. Such pumps can be found among those sold under the "Dosatron" trademark.

Solid media may be added manually (e.g. to the tank 31) or may be pre-mixed into one of the liquid supplies and then added into the SSM fluid 7 by activating the dosing mechanism 82, provided that it is suitable for handling solid particles of the desired size, or both. The operator may use the HMI 40 to activate the dosing mechanism 82 to feed desired quantities of solvent and/or anti-foaming agent into the tank 31. The SSM fluid 7 may have a predetermined or otherwise known concentration (by volume) of solid media particles, which may be partly dependent on the density of the solid media particles, such that for higher density particles, a lower volume of those particles may be used compared to when particles of lower density are used. Using the HMI, the operator may enter the desired concentration of the solid media particles, for example, by inputting the density of the solid media material (e.g., in units of pounds per cubic foot). Alternatively, the HMI 40 may allow the operator to select a general concentration indicator, such as 'low", "medium" or "high" based on the operator's understanding of the desired media density.

The tank 31 may include a liquid level sensor 85, and such a sensor may be used to indicate if the amount of SSM fluid 7 has dropped below a desired level (which can be set using the HMI 40), whereupon the HMI 40 may alert the operator to increase the amount of SSM fluid 7. One way to increase the amount of solid media is to simply add more solid media, either manually or by activating the apparatus 10 to dispense more into the tank 31. The ratios of water, solvent and anti-foaming agent may be preset or the operator can change them as desired.

The speed of the media pump 37 may be adjustable to create different levels of flow of SSM fluid 7 out of the media pump 37 as desired. The operator may adjust the speed of the media pump 37 using the HMI 40. The media pump 37 speed may, for example, be set as a percentage of the maximum speed of the pump 37. In determining the speed of the media pump 37, the operator or the apparatus 10 may consider, among other things, the concentration and/or density of the solid particles in the SSM fluid 7; denser or higher concentrations of particles may require higher media pump 37 speeds to better maintain the particles in suspension.

A manifold may be situated (fluidically) between the media pump 37 and the nozzles 28. Such a manifold may allow the outflow from the media pump 37 to be divided for flow to each of the nozzles 28. Each nozzle may be connected by fluid conduits 43 to an outlet of the manifold. Additionally, valves 88, which may be adjustable valves, may be situated between the manifold and each of the nozzles 28. Such valves 88 may be used to control the volume of SSM fluid 7 that flows to and thus through the nozzles 28 during a given period of time. For example, one of the valves 88 may simply be open or closed, thereby producing full flow or no flow of the SSM fluid 7. Alternatively, one of the valves 88, if adjustable, may be adjusted to achieve a flow rate of the SSM fluid 7 resulting from a valve position that is between the fully open and fully closed positions, such as 40 gallons per minute or a lower or higher rate. The operator may open/close valves 88 and/or adjust valves 88 to achieve higher or lower flow rates using the HMI 40. When valves 88 are fully open, the SSM fluid 7 flows through the valves 88 relatively freely. As valves 88 are adjusted to be more closed and thus restrict the flow rate of the SSM fluid 7, solid media particles may fall out of suspension and may collect upstream of valves 88. The lower the flow rate, the greater the degree to which this may occur. If valves 88 are then adjusted to be more open, the collected particles begin to get captured by the flowing liquid, which increases the concentration of solid media particles in the SSM fluid 7. Thus, if the apparatus 10 is operating with valves 88 adjusted at less than fully open, and the liquid level sensor 85 indicates that the amount of SSM fluid 7 has dropped below a desired level in the tank 31, then in addition to or as an alternative to adding more fluids to the current SSM fluid 7 in the system, the amount of SSM fluid 7 flowing through the nozzles 28 may be increased by adjusting the valve 88 to be more open. A reducer can also be arranged on the suction inlet of the media pump 37 or at the outlet 73 of the tank 31, to increase the flow velocity of the SSM fluid 7 moving through the media pump 37.

A heater 91 may be positioned in or near the tank 31, such as a submersion heater mounted near the inside bottom of the tank 31. The heater 91 may be used to heat the SSM fluid 7 and to maintain the SSM fluid 7 at a desired temperature during operation. The desired temperature may be preset or adjusted by the operator. The apparatus 10 may include a temperature sensor 109 for sensing the temperature and also may include controls for automatically adjusting the heater 91 to maintain the SSM fluid 7 at the desired temperature. The SSM fluid 7 in the tank 31 can be heated to the desired temperature prior to starting the process to spray the AM- Parts 19, or the SSM fluid 7 can begin to be sprayed before it is heated up or when it is only partially heated up. In this latter approach, the process may begin at a low temperature and, as time elapses during the process, the temperature increases to the desired temperature. The approach of gradually increasing the temperature of the SSM fluid 7 may aid in the removal of support material 13. This is because the SSM fluid 7 can usually remove support material 13 over a range of temperatures. Thus, by applying the SSM fluid 7 to the AM-Part 19 as the SSM fluid 7 is heating, the SSM fluid 7 may begin to remove support material 13 (and also smooth exposed build material 16) as the SSM fluid 7 reaches the lowest temperature suitable for removing support material 13, and then remove the support material 13 more rapidly (and smooth exposed builder material 16) as the SSM fluid 7 approaches the final desired temperature. In this manner, the build material 16 of the part will not heat up as much in contrast with the situation in which the SSM fluid 7 is at the highest temperature from the start of the process. In situations where the build material 16 is sensitive to heat, this may help to protect the main body of the AM-Part 19 from degradation.

The first and second nozzles 28 may be mounted in the chamber 25 and aimed toward the turntable 22. The turntable 22 may be for supporting one or more AM-Parts 19 to be processed. The first nozzle 28A (the "side nozzle") may actuate in the vertical direction (i.e. up and down), and may be mounted such that its horizontal position can be set closer to or further away from the turntable 22. The first nozzle 28A may be for spraying SSM fluid 7 generally parallel to the surface of the turntable 22, and thus to impact the side surfaces of AM-Parts 19 sitting on the turntable 22. The second nozzle 28B, (the "top nozzle") may actuate in the horizontal direction (i.e. left and right and/or front and back), and may be mounted such that its vertical position can be set closer to or further away from the turntable 22. The second nozzle 28B may be for spraying SSM fluid 7 down toward the surface of the turntable 22, and thus to impact the upward facing as well as vertically oriented surfaces of the AM-Parts 19 that are sitting on the turntable 22. More than one first nozzle 28A and/or more than one second nozzle 28B may be employed.

The nozzles 28 may be set closer to or further away from the turntable 22 through manual adjustment, but such an ability to adjust the distance of the nozzles 28 may also be automated. The degree to which the first and second nozzles 28 actuate up/down and left/right (or front/back), respectively, as well as the speeds at which they actuate, may be set by the operator using the HMI 40. These distances and speeds may be among any range of travel and speed, respectively, permitted by the apparatus 10. For example, the first nozzle 28A may be set so that it travels up and down any distance up to 43 millimeters, with the starting point being 6 millimeters above the top surface of the turntable 22. The second nozzle 28B may be set so that it travels forward and backward any distance up to 112 millimeters, with the center point of such travel being aligned with the center of the turntable 22. Likewise, for example, the first nozzle 28A may be set to travel at a speed of 22 millimeters/second while the second nozzle 28B may be set to travel at the same or a different speed.

Although the embodiments illustrated in the Figures include a single side nozzle and single top nozzle, multiple side and/or top nozzles 28 also may be used. Additionally, while the embodiments illustrated in the Figures show nozzles 28 in fixed orientations, mechanisms and controls may be included to enable the nozzles 28 to have further degrees of movement independent of the actuators 58 to which they are connected. For example, in addition to traveling up and down, the side nozzle 28A may be configured to articulate about its own axis in left/right, up/down and/or circular motions. Likewise, the top nozzle 28B may be configured to articulate about its own axis in left/right, front/back and/or circular motions. The speed at which the nozzles 28 articulate may also be adjustable.

Figure 5A:
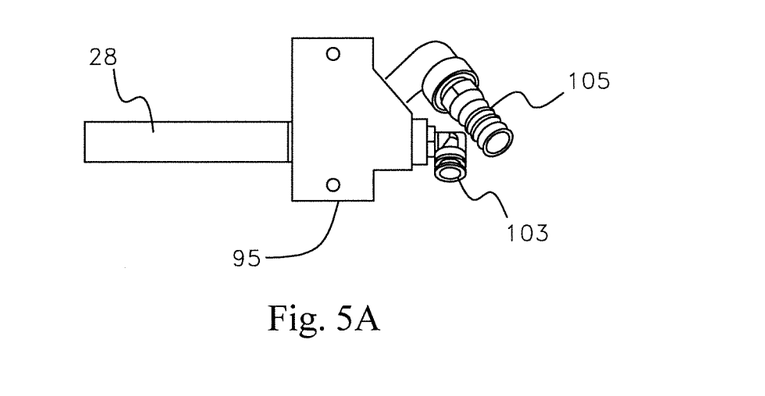
FIGS. 5A, 5B, and 5C, which are front, side, and top views respectively of a nozzle manifold that is in keeping with the invention.
Figure 5B:
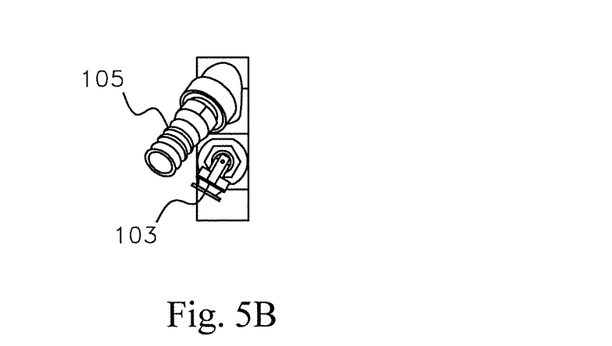
Figure 5C:
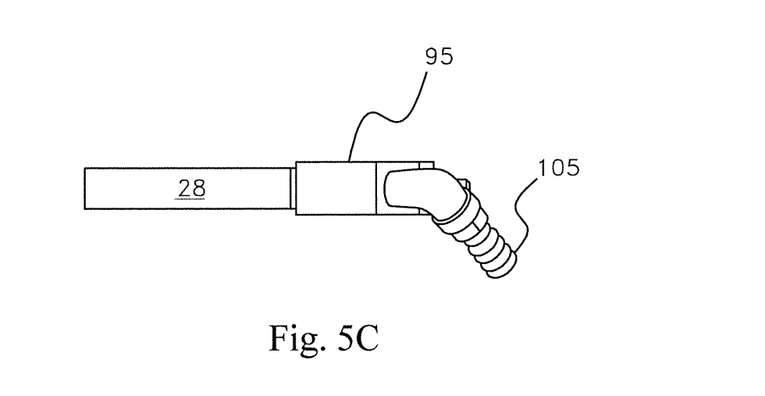
Figure 6A:
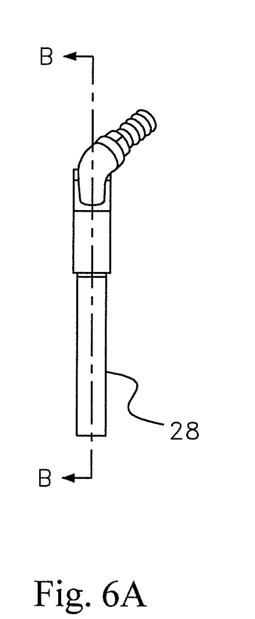
Figure 6B:
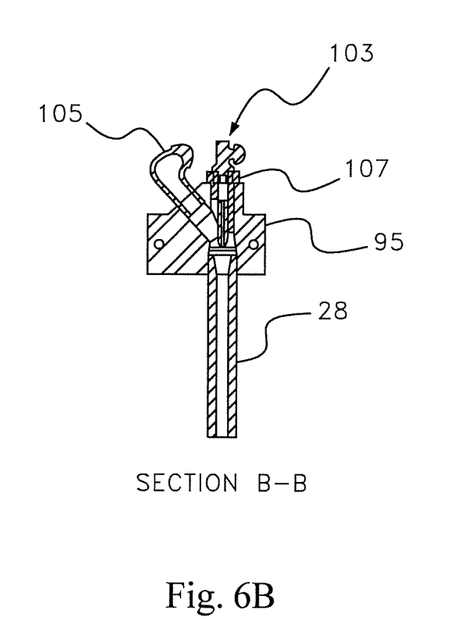

Referring to FIGS. 5 and 6, the nozzles 28 may be designed in such a way to include an inlet for SSM fluid 7 (from the media pump 37) and an inlet for compressed air (from pump 104 or port 79D). More specifically, such a nozzle 28 may be mounted on a manifold 95 having inlets 105, 103 to which the supplies of SSM fluid 7 and compressed air are connected, respectively. The SSM fluid 7 may enter the nozzle 28 through manifold 95 upstream of the compressed air. An injector 107 may be used to add compressed air from air pump 104 or from port 79D to the flow of SSM fluid 7. The point at which the air is injected into the SSM fluid 7 may be at the manifold 95 or at the nozzle 28. The injection of compressed air creates a high-velocity stream of SSM fluid 7 directed toward the AM-Part 19, and which is located on the turntable 22. The collision between the high-velocity SSM fluid 7 and the support material 13 breaks the attachment point between the build material 16 and the support material 13. Additionally, the impact of SSM fluid 7 with the AM-Part 19, as well as its subsequent flow along the surfaces of the AM-Part 19, smooths the outer surface of the build material 16 since the solid particles in the SSM fluid 7 may be abrasive. Even further, the liquid detergent that is part of the SSM fluid 7 may be formulated such that it chemically dissolves the support material and outer surface of the AM-Part 19 to further aid in surface finishing and removal of unwanted support material 13.

Due to the nozzle 28 configuration, the velocity and pressure at which the SSM fluid 7 leaves the nozzle 28 may be varied by altering the volumetric flow of the SSM fluid 7 (by adjusting the media pump 37 speed and/or adjusting the valve 88), the pressure of the air stream injected by the injector 107, or both in combination. The pressure of the air stream may be adjusted upward or downward using the valve 94A located between the compressed air supply and the nozzles 28. Using separate valves 94A for the first and second nozzles 28A, 28B, the air pressure at each of the nozzles 28 may be set at the same or different levels. In addition to using valves 94A for supplying air to the nozzles 28, the valves 94A may be used to selectively turn the air supply to each nozzle 28 on or off. This may include "pulsing" by turning the air to a nozzle 28 on and off at selected intervals, thereby pulsing the velocity and pressure of the SSM 7 fluid leaving the nozzles. For example, the air supply valve 94A may be set to turn on every five seconds and to run for one second each time it is turned on. The frequency and duration of opening and closing the air valve 94A may be among any range of values permitted by the apparatus 10, and may be set by the operator using the HMI 40. This ability to alter the flow of SSM fluid 7 may increase the efficiency and efficacy of the overall process and further reduce the likelihood that a part will be damaged during the process. The chamber 25 may include a vent 97 so that, as air is injected through the nozzles 28, excess amounts of air in the chamber 25 may escape through the vent 97 rather than accumulate to an excessive or dangerous level.

Additionally, the nozzles 28 may be selectively used and/or the nozzles 28 may be adjusted to increase efficiency and/or efficacy in situations in which all of the nozzles 28 are not required to remove support material 13 from and/or smooth surfaces of a AM-Part, and/or where it is preferred to have some nozzles 28 at higher or lower pressures than others and/or to operate in a pulsing fashion. To accommodate such versatility, the level of flow from the media pump 37 (leading to the manifold and thus the nozzles 28) may be set as a percentage of its maximum flow level (e.g., 65%), and/or the pressure of air from the forced air supply (leading to the nozzles 28) may be set as a percentage of its maximum pressure (e.g., 40%). These may be referred to as "system level settings". Also, (a) the valves 88 controlling the flow of SSM fluid 7 to each nozzle 28 may be set closed or open and, when open, the degree of openness (e.g., as a percentage of the fully open condition) may be modified, and/or (b) the air supply to each individual nozzle 28 may be turned on or off (by opening and closing the valves 94A, which are connected to the air supplies for each nozzle 28), either altogether or at selected frequencies and durations to create a desired pulse level (e.g., open for 1 second every 5 seconds). These may be referred to as "nozzle level settings."

For example, in one mode of operation the pressure of the SSM fluid 7 flowing from the side nozzle 28A is set at a low level (e.g., 75% for fluid and 20% for air) and either the pressure of the SSM fluid 7 flowing from the top nozzle 28B is also set to a low level or the valve 88 to the top nozzle 28B is closed so that SSM fluid 7 sprays only from the side nozzle 28A. This may be accomplished using only the system level settings or a combination of the system and nozzle level settings. This mode produces a low degree of agitation of the additively manufactured parts being processed in the chamber 25, and may be referred to as "ultra-low agitation." In another mode of operation, the pressure of the SSM fluid 7 flowing from the side nozzle 28A and top nozzle 28B is set at a slightly higher level than for ultra-low agitation (e.g., 75% for fluid and 30% for air), and with the top nozzle 28B operating intermittently (i.e., pulsing) for short periods (e.g., open for 1 second every other second). The SSM fluid 7 and air pressures may be accomplished using only the system level settings or a combination of the system and nozzle level settings, and the pulsing may require use of the nozzle level setting at least for air. This mode produces a higher degree of agitation than for "ultra-low agitation", and may be referred to as "low agitation." In yet another mode of operation, the pressure of the SSM fluid 7 flowing to both the side and top nozzles 28A, 28B is set to a medium level (e.g., 100% for fluid and 50% for air) but then intermittently adjusted upwards to a higher pressure at both nozzles 28A, 28B (by increasing the air setting, e.g., to 70%) on a pulsing basis. This mode produces a higher degree of agitation than the settings for "low agitation", and may be referred to as "medium agitation." In yet a further mode of operation, the pressure of the SSM fluid 7 flowing to both the side and top nozzles 28A, 28B is set at a high level (e.g., 100% for fluid and 70% or higher for air). This mode produces a high level of agitation, and may be referred to as "high agitation." Other arrangements of nozzles 28, open versus closed valves 88, 94A, and combinations of lower and higher fluid and air pressures and/or intermittent use of lower and higher pressures, may be used to create even more variations in the levels of agitation. Thus, the use of the terms "low," "medium" and "high" are not meant to be limited to the precise arrangements described in the foregoing examples, but rather to exemplify that various, relative degrees of agitation may be accomplished as desired to meet specific needs.

The HMI 40 may be configured such that the operator may set operating parameters that together achieve a desired level of agitation, or may select a desired level of agitation from options presented at the HMI, or the agitation level may be pre-stored in connection with a given operating recipe that the operator may have the option to select or define. By setting the agitation level, the apparatus 10 may automatically open and close the valves 88 to the nozzles 28 and adjust the pressures to achieve that level of agitation.

Further included with the apparatus 10 may be a pH sensor 106, temperature sensor 109, and/or pressure sensor 112 for the SSM fluid 7. The temperature sensor 109 may detect the temperature of the SSM fluid 7 in the tank 31. The pH sensor 106 may detect the pH level of the SSM fluid 7 in the tank 31. The pressure sensor 112 may be used to detect changes in, or the absence of, pressure across valves 88 or nozzles 28. Changes in pressure may indicate blockage that may need to be cleared.

A vision system, which may include a camera 115, may be included to detect the rate at which support material 13 is removed or surface finishing of the build material 16 is occurring. The vision system may also detect the level of smoothness of surface finishing at any given point in time. The image that is read in by the vision system may also be compared to a CAD file of the AM-Part 19 including support material 13 to optimize the process as it occurs. This comparison may be made by the computer 40B associated with the HMI 40 or a separate computer for detecting when the desired amount of support material 13 has been removed from the AM-Part 19 and/or when a specific surface finish of the build material 16 has been achieved.

The turntable 22 may have openings so that SSM fluid 7 sprayed from the nozzles 28 can pass through the turntable 22 and into the tank 31, and not collect on the top surface of the turntable 22 surface. The turntable 22 may include features so that one or more AM-Parts 19 to be processed may be secured to the turntable 22 using any suitable means, such as T-nuts, bolts, clamps, etc.

Alternatively, a cage structure may be mounted to the turntable 22 so that AM-Parts 19 may tumble during processing but be restrained by the cage. The turntable 22 may be connected to an actuator 64 for rotating the turntable 22 clockwise or counter-clockwise. The actuator 64 may be, for example, a servomotor that spins a shaft having a gear, with a chain mounted on that gear as well as on a gear connected to the turntable 22, thereby causing the turntable 22 to spin. The speed of rotation may be variable and may be set by the operator using the HMI 40. The speed at which the turntable 22 rotates may be any speed permitted by the apparatus 10, and may be expressed, for example, in terms of a percentage of maximum RPM (revolutions per minute) at which the turntable 22 may rotate. One or more grates 67 may be positioned near or below the turntable 22, which prevent support material 13 or other unwanted sediment from falling into the tank 31. The apparatus 10 may include an upper grate 67A located near the turntable 22. Also, there may a lower grate 67B below the turntable 22 and closer to the tank 31 for catching pieces of unwanted support material 13, or any other debris or sediment, that may fall through the upper grate(s) 67A or the openings in the turntable 22 and thereby prevent such pieces, debris, and/or sediment from getting sucked into the media pump 37. Alternatively, the upper grate(s) 67A may be eliminated and only the lower grate(s) 67B used, and vice versa.

The pump system 55 may include the media pump 37 and a CIP pump 118. The media pump 37 has an inlet in fluid communication with the outlet 73 of the tank 31, such tank outlet 73 being at or near the bottom of the tank 31 where SSM fluid 7 is stored. The output of the media pump 31 may be connected to the fluid conduits 43A, which may be arranged as a manifold, and the manifold's outlets may be fluidically connected to the nozzles 28, which are located within the spraying chamber 25. A valve 88, which may be an adjustable valve, may be situated in-line between the manifold and the nozzles 28, and may be used to turn the flow on/off or adjust the rate of flow of SSM fluid 7 to the nozzles 28. The speed of the media pump 37 also may be adjusted to increase or decrease the rate of flow of SSM fluid 7 to the manifold and thus the nozzles 28.

The media pump 37 is suitable to handle SSM fluid 7, preferably including SSM fluid 7 having a solid particle concentration (by volume) of up to 50%. The ability of the media pump 37 to handle such high solid concentrations allows for the SSM fluid 7 to flow at a high pressure and high velocity. After SSM fluid 7 is pushed out of the nozzles 28 to spray the AM-Part, the SSM fluid 7 is gathered back into the tank 31, which, again provides the SSM fluid 7 to the media pump 37, which in turn, again pumps the SSM fluid 7 to the nozzles 28.

The tank 31 may be designed so that the SSM fluid 7 is encouraged to flow to the tank outlet 73 and then to the media pump 37. It is possible that the solid particles may fall out of solution and can gather on the floor of the tank 31. The tank 31 may be configured to create a flow pattern, such as a vortex, which prevents the collection of such particles on the floor of the tank 31. Another manner of preventing the collection of particles on the floor of the tank 31 is to utilize the media pump 37 by connecting the media pump 37 not only to the nozzles 28, but also to one or more fluid conduits 43B (e.g. hoses, tubes and/or pipes) connected back to the tank 31 (either directly or through the manifold). A valve 100 may be situated between the media pump 37 and the fluid conduits 43B or otherwise in-line with the fluid conduits 43B. Consequently, a portion of the SSM fluid 7 drawn from the tank 31 by the media pump 37 may be circulated directly back to the tank 31 in order to keep the SSM fluid 7 well-mixed and avoid the collection of particles on the floor of the tank 31. Additionally, compressed air from the forced air supply may be provided to the SSM fluid 7 within the tank 31 in order to keep the SSM fluid 7 well-mixed and avoid the collection of particles on the floor of the tank 31. The amount of such air provided to the SSM fluid 7 in the tank 31 may be adjusted using a valve 94B and controlled using the HMI 40. The simultaneous feeding of SSM fluid 7 and compressed air directly into the tank 31 creates flow or agitation in the tank 31 for helping to sustain the suspension of media particles in the SSM fluid 7. This flow/agitation may be generated continuously during operation of the process, or intermittently, and at different levels of pressure. For example, where denser and/or higher concentrations of solid media are used in the SSM fluid 7, the flow/agitation may be more frequent and at higher pressure, such as on/off every 30 seconds with the forced air at a pressure of 20 psi. As mentioned above, the speed of the media pump 37 may be adjustable and so in setting the speed of the media pump 37 the operator or computer 40B may account for the concentration and/or density of the solid particles in the SSM fluid 7 (denser or higher concentrations of particles may require higher media pump 37 speeds to keep the particles in suspension). In the situation where the density of the solid media is lower, the flow of SSM fluid 7 and/or air back to the tank 31 may be less, less frequent, and at lower pressure, such as on/off every 2 minutes with forced air at a pressure of 10 psi. These parameters may be set as necessary to keep the solid particles in suspension. These parameters may be pre-programmed into the computer 40B or manually selected by the operator using the HMI 40. With the use of this approach for maintaining suspension of the solid media, it may be less important to incorporate sloping sides 73 into the tank 31, though one or both may be used.

For processing a given AM-Part 19 or set of AM-Parts 19, the operator may use the HMI 40 to set the length of run time, or the run time may be predetermined generally or with respect to any given recipe. During operation of a system that is in keeping with the invention, solid particles from the SSM fluid 7 may collect on surfaces of the chamber 25 and structures within the chamber 25 (including the nozzles 28, turntable 22, etc.) and, as the process comes to an end, may also collect on surfaces of the AM-Part 19 being processed. The apparatus 10 can include a CIP system 121 for rinsing the solid particles off of these surfaces. The CIP system 121 may comprise the CIP pump 118 connected to a CIP nozzle 70, directly or through a manifold, and may use liquid detergent or plain water, not including solid media, for this rinsing process. The liquid detergent for such rinsing purpose may be extracted from the SSM fluid 7. More specifically, after the process of spraying SSM fluid 7 ends, the media pump 37 may be turned off for a period of time sufficient for the media particles suspended in the SSM fluid 7 in the tank 31 to settle to the bottom of the tank 31. A CIP inlet 124 to the CIP pump 118 may be connected to the tank 31 and arranged so that the opening of the CIP inlet 124 within the tank 31 is situated at a height sufficiently above the bottom of the tank 31 so that the SSM fluid 7 entering the CIP pump 118 will be devoid or substantially devoid of solid media particles (due to their having settled to the bottom of tank 31). Filters 127 may be associated with the CIP inlet 124 to reduce or eliminate solid particles making their way into the CIP pump 118 and CIP nozzle 70. The CIP pump 118 may be operated for a period of time to draw fluid from the tank 31 and force it to the nozzles 28 where it is sprayed about the surfaces within the chamber 25 to rinse solid media particles off of those surfaces and down into the tank 31. Alternatively, a clean water or clean detergent supply may be used for such rinsing purpose. The CIP nozzle 70 may be any suitable nozzle, and without limitation may comprise a tube with a plurality of apertures, or a system of tubes and apertures (or nozzles mounted on the tubes).

Rather than using a tank 31 comprising a single basin, the tank 31 may be separated into two sections: A first section containing SSM fluid 7, and a second section containing only clean liquid detergent or water. The section containing the clean liquid detergent/water may be used for the CIP system 121, and may include its own heater for maintaining the clean liquid detergent/water at a desired temperature. Additionally, the CIP pump 118 may be used to drain all the liquid detergent/water from the tank 31.

Figure 7:
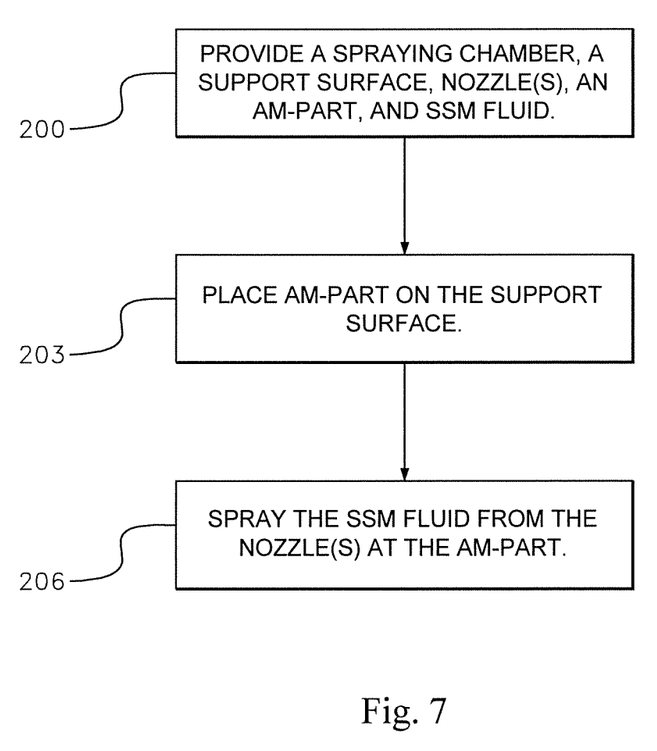
FIG. 7, which is a flow diagram of a method that is in keeping with the invention.

The invention may be embodied as a method of removing support material and/or smoothing surfaces of an additive-manufactured part. In such a method, a spraying chamber, a support surface, one or more nozzles, an AM-Part, and SSM-fluid may be provided (200). The AM-Part may be placed (203) on the support surface, and the SSM fluid may be sprayed (206) from the nozzle at the AM-Part.

The horizontal position of the first nozzle 28A and the vertical position of the second nozzle 28B may be adjusted to be desired distances away from the turntable 22. An AM-Part 19 may be placed on the turntable 22 within the spraying chamber 25, which may be accessed through a pass-through door 130. The AM-Part 19 may be resting on the turntable 22, with or without a cage covering, or secured to the turntable 22. The pass-through door 130 may then be closed and secured shut, essentially making the spraying chamber 25 watertight. A user may then use the input system of the HMI 40 to select operating parameters for the apparatus 10 based on the AM-Part 19 and/or support material 13 and build material 16 properties such as density, geometry, material, and/or porosity. The operating parameters may include one or more of the concentrations of the liquids and solid particles making up the SSM fluid 7, the temperature to which the SSM fluid 7 in the tank 31 will be heated, the pH level to be maintained, the pressure at which the SSM fluid 7 will be pumped to the nozzles 28 (by setting one or both of the speed of the media pump 37 and the degree to which valves 88 between the media pump 37 and nozzles 28 are open), the pressure of the air to the nozzles 28, the on/off and/or pulsing level for each nozzle 28, the length of time for running the process, the agitation level for maintaining solid particles suspended in the SSM fluid 7 in the tank 31 (i.e., intervals at which fluid is pumped directly back to the tank 31 and pressure of air fed into the tank 31), and/or the length of time for rinsing at the end of the process. The operating parameters also may include settings for the starting point and distance of travel of the nozzles 28, preferably set to ensure that the AM-Part 19 are always encompassed during the process by the SSM fluid 7 spray, as well as the speed of travel of the nozzles 28 and the direction and speed of rotation of the turntable 22. These distances and speeds may be any value within the minimums and maximums permitted by the system. These parameters may be pre-programmed into the apparatus 10 as various "recipes" that may be selected by the operator using the HMI 40. These parameters are modified, and may be selected to increase the efficiency of a support removal and surface finishing process, such as decreasing cycle time or decreasing the desired outer surface roughness. In an embodiment of the invention, some or all of the parameters may be determined automatically using, for example, a vision system that may identify the support material 13, the build material 16, the geometry of the AM-Part 19, their properties including surface roughness, etc. The computer 40B then may take action to adjust the operating parameters so that the AM-Part is processed toward a desired outcome. The vision system may use the CAD model file and other metadata for the AM-Part 19 to assist in making this assessment.

After the operating parameters are inputted or otherwise selected, the tank 31 may be filled with fluid and solid media particles (either fully automatically based on the selected operating parameters, or with the operator manually adding the solid particles) forming the SSM fluid 7. The liquid level sensor 85 may indicate when the tank 31 is filled to the desired level, whereupon the filling stops. The heater 91 in the tank 31 may be activated to begin heating the SSM fluid 7 to the desired temperature. Then, the support removal and surface finishing process may begin. It may begin before or after the SSM fluid 7 is heated to its final desired temperature. The media pump 37 may be activated, forcing the SSM fluid 7 to flow from the tank 31 and through the media pump 37 to the nozzles 28. The media pump 37 also may force a portion of the SSM fluid 7 to flow directly back to the tank 31 at defined intervals, so that, together with the forced air being supplied to the tank 31, the solid particles are maintained in suspension. The first and second nozzles 28 may be aimed toward the turntable 22 where the AM-Parts 19 are located. As the SSM fluid 7 reaches the input to the nozzles 28, the SSM fluid 7 may be combined with a stream of compressed air within a nozzle 28. This combination of SSM fluid 7 and compressed air creates a high-velocity, pressurized stream of SSM fluid 7 that may be sprayed toward the AM-Part 19, for impacting the support material 13 and surfaces of the build material 16 of the AM-Part 19.

Once the media pump 37 begins to force SSM fluid 7 through the nozzles 28, an actuator 58 may cause the nozzles 28 to move over the range of distances and at the speeds indicated by the selected operating parameters. Flow from the nozzles 28 may also pulse if indicated by the selected operating parameters. The first (side) nozzle(s) 28A may actuate in the vertical direction, while the second (top) nozzle(s) 28B may actuate in the horizontal direction. Additionally, the turntable 22 on which the AM-Part 19 is placed may rotate in a circular motion, in the direction and at the speed indicated by the selected operating parameters. The combination of the vertical and horizontal movement of the nozzles 28 (including their range and speed of movement) and the rotation (and speed of rotation) of the turntable 22 may allow for the complete outer surface of build material 16 to be smoothed and for the unwanted support material 13 removed. This combination also may be used to target specific areas of an AM-Part 19. For example, if the support material 13 is asymmetric on the AM-Part 19, the AM-Part 19 may be oriented so that the side having more support material 13 is targeted longer. Additionally, for a given pressure and velocity generated by a nozzle 28 (as well as any pulsing), the pressure at which the SSM fluid 7 impacts the outer surface of the AM-Part 19 and the support material 13 may be varied based on the distances from the turntable 22 at which the nozzles 28 have been set, as well as the speed at which the turntable 22 rotates and the speeds at which the first and second nozzles 28A, 28B are actuated vertically and horizontally, respectively. It may be important to note that both types of nozzles 28A, 28B, along with the turntable 22, may operate simultaneously in order to reduce the cycle time of the process while also increasing the efficiency and/or efficacy of the process, such as better surface finishing and support removal.

The parameters for the process may be different and/or customized in order to account for particular build materials 16 and support materials 13 from which the AM-Parts 19 are made, the geometry of the AM-Part 19 including the geometries of support material 13, and the degree and speed at which support material 13 is removed, as well as the degree and speed at which the build material 16 is smoothed. Additionally, during a single operation on an AM-Part 19 or group of AM-Parts 19, the operating parameters do not need to remain constant. For example, they may be set to be more aggressive at the beginning of the cycle and then automatically adjust, or be manually adjusted, to less aggressive settings later in the process as less support material 13 remains. Where a vision system is used to determine some or all of the parameters, the vision system may also be used to evaluate the AM-Part 19 during processing and then inform the control system of changes to the operating parameters based on any number of factors, including for example the amount of support material 13 remaining and the level of build material 16 smoothness thus far achieved versus the desired end smoothness. Balancing and varying these operating parameters increases the effectiveness and efficiency at which support material 13 may be removed and build material 16 surfaces can be smoothed, without damage to the AM-Part 19. Additionally, choices may be made to prioritize one goal over another. For example, for surface smoothing of the build material 16 versus removal of the support material 13 for a given AM-Part 19 geometry made from given materials, it may be preferable to decrease fluid pressure, reduce the amount of air, reduce the amount of pulsing, change the ratio of solid media within the SSM fluid 7, change the makeup of the SSM fluid 7, or a combination thereof. Any given set of operating parameters may be saved as a recipe in a memory associated with the computer 40B, and that recipe may be selected by the operator in the future rather than re-inputting each of the operating parameters.

During the process, if the liquid level sensor 85 indicates that the SSM fluid 7 has dropped below a minimum level (e.g., due to evaporation of fluids), additional fluids may be automatically supplied using the dosing mechanism 82 to refill the tank 31 according to the desired concentrations. Likewise, if the pH sensor 106 indicates that the pH level has changed from the desired level, additional fluids may be added using the dosing mechanism 82 to adjust the pH upwards or downwards. For efficiency, the SSM fluid 7 may be heated, i.e., kept above a minimum temperature. On the other hand, if the SSM fluid 7 gets too hot, it could damage or degrade the AM-Part 19. In these cases, the user may control the temperature to make sure the SSM fluid 7 is heated but not above a maximum temperature.

When the end of the desired cycle time for spraying SSM fluid 7 is reached, the media pump 37 may cease to operate, and the solid particles within the SSM fluid 7 may be allowed to settle to the bottom of the tank 31. The CIP pump may then begin to draw fluid (devoid or substantially devoid of solid media particles) from the tank 31 and force it through the CIP nozzles 70 to clean residual solid particles from surfaces of and within the spraying chamber 25 as well as surfaces of the AM-Part 19. During both the main AM-Part 19 processing cycle and the rinsing cycle, heat from the SSM fluid 7 in the tank 31 may heat air in the chamber 25, and the warm air may serve to help dry the AM-Part 19 after the rinsing cycle. When the CIP cycle is completed, the operator may open the spraying chamber 25 and remove the AM-Parts 19. Before removing the AM-Parts 19 from the chamber 25, the operator may allow them time to dry, which drying may be aided by the heated air in the chamber 25.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art, and those alternatives, modifications, variations, and/or improvements are also intended to be encompassed.

Although the invention has been described with respect to one or more particular embodiments, it will be understood that other embodiments of the invention may be made without departing from the spirit and scope of the invention. In particular, a method according to the invention may be a combination of activities and/or steps described herein.

What is claimed is:

1. An apparatus configured for removing support material from and/or smoothing surfaces of an additive-manufactured part, comprising:
   a spraying chamber;
   a support surface within the spraying chamber, the support surface configured to support an additive-manufactured part; and
   one or more nozzles configured to spray a suspended solid media fluid ("SSM-fluid") at the additive-manufactured part, wherein the SSM-fluid comprises solid particles and a liquid.

2. The apparatus of claim 1, wherein at least one of the one or more nozzles further comprises:
   a first inlet for receiving a flow of the SSM-fluid; and
   a second inlet for receiving a flow of air;
   an outlet through which SSM-fluid can exit the nozzle; and
   wherein the nozzle is configured to combine the SSM-fluid and the air prior to exiting the outlet of the nozzle.

3. The apparatus of claim 1, further comprising a tank configured to hold at least some of the SSM-fluid.

4. The apparatus of claim 1, further comprising a heater, the heater configured to heat the SSM-fluid to a desired temperature.

5. The apparatus of claim 1, wherein the support surface has one or more openings configured to permit the SSM-fluid to pass through the one or more openings.

6. The apparatus of claim 1, wherein:
   the support surface is rotatable in one or both of clockwise and counterclockwise directions; and
   the apparatus further comprises
   a first actuator for rotating the support surface.

7. The apparatus of claim 6, wherein at least one of the one or more nozzles is connected directly or indirectly to a second actuator configured to translate the at least one nozzle in a substantially planar motion.

8. The apparatus of claim 1, wherein the nozzles include:
   a first nozzle configured to spray the SSM-fluid substantially in a first direction; and
   a second nozzle configured to spray the SSM-fluid substantially in a second direction.

9. The apparatus of claim 8, wherein the first direction is substantially perpendicular to the second direction.

10. The apparatus of claim 9, wherein: the first direction is substantially horizontal; and the second direction is substantially vertical.

11. The apparatus of claim 1, further comprising a pH monitor configured to monitor a pH of the SSM-fluid.

12. The apparatus of claim 1, farther comprising a pump for pumping the SSM-fluid to the one or more nozzles.

13. The apparatus of claim 1 further comprising a valve for regulating a flow of air to the one or more nozzles.

14. The apparatus of claim 1 further comprising a computer for controlling flow of the SSM-fluid to the one or more nozzles.

15. The apparatus of claim 14, wherein the computer includes a memory storing operating parameters.

16. The apparatus of claim 15, wherein the operating parameters include at least one of:
   (a) a temperature of the SSM-fluid,
   (b) a pressure of the SSM-fluid,
   (c) a pressure of air supplied to the one or more nozzles.

17. A method configured for removing support material from and/or smoothing surfaces of an additive-manufactured part, comprising: supporting an additive-manufactured part at a location via a support surface; providing a suspended solid media fluid (the "SSM-fluid") comprising a liquid and solid particles; and spraying the SSM-fluid toward the additive-manufactured part via at least one nozzle in a spraying chamber.

18. The method of claim 17, limiter comprising rotating the additive-manufactured part in a clockwise or counterclockwise direction while spraying the SSM-fluid.

19. The method of claim 17, further comprising: providing a flow of air; and combining the flow of air with the SSM-fluid.

20. The method of claim 19, further comprising rotating the additive-manufactured part in a clockwise or counterclockwise direction while spraying the SSM-fluid.

21. The method of claim 17, further comprising varying a flow rate of the SSM-fluid.

22. The method of claim 21, wherein varying the flow rate includes controlling a valve.

23. An apparatus configured for removing support material from and/or smoothing surfaces of an additive-manufactured part, comprising:
a spraying chamber;
a support surface within the spraying chamber, the support surface configured to support an additive-manufactured part;
one or more nozzles configured to spray a suspended solid media fluid ("SSM-fluid") at the additive-manufactured part; and
a vision system configured to detect support material removal and/or surface smoothing of the additive-manufactured part.

24. The apparatus of claim 23 wherein the vision system comprises a camera.

25. The apparatus of claim 23 further comprising a computer operatively adapted to compare an output of the vision system to a CAD file of the additive-manufactured part.

26. The apparatus of claim 23 wherein the vision system is configured to detect a level of smoothness of surface finishing at a given point in time.

27. The apparatus of claim 23 wherein the vision system detects at least one of: support material of the additive-manufactured part, build material of the additive-manufactured part, geometry of the additive-manufactured part, or surface roughness of the additive-factored part.

28. An apparatus configured for finishing an additive-manufactured part, comprising:
a spraying chamber;
a support surface configured to support an additive-manufactured part within the spraying chamber;
at least one upper nozzle located above the support surface, oriented downward, and configured to spray a liquid fluid that has solid material particles suspended therein onto an additive-manufactured part located on the support surface; and
at least one side nozzle located adjacent the support surface, and oriented horizontally, and configured to spray the liquid fluid that has solid material particles suspended therein onto the additive-manufactured part located on the support surface.

29. The apparatus of claim 28 further comprising:
a vision system configured to detect support material removal and/or surface smoothing of the additive-manufactured part.

30. The apparatus of claim 28 further comprising:
a controller responsive to properties of the additive-manufactured part and operatively adapted to adjust operating parameters for the at least one upper nozzle and the at least one side nozzle, wherein the properties of the additive-manufactured part include at least one of roughness, geometries, delicateness, density, material, and porosity and wherein the operating parameters include at least one of: fluid pressure, an amount of air, an amount of pulsing, a ratio of solid media within the liquid fluid, a makeup of the liquid fluid, or a combination thereof.

31. The apparatus of claim 28 further comprising:
a clean-in-place system located in the spraying chamber and configured for rinsing solid particles off surfaces of the additive-manufactured part.

32. The apparatus of claim 28 further comprising:
a cage structure mounted to the support surface for restraining the additive-manufactured part during spraying.

* * * * *